Aug. 21, 1928.
A. YTTERBERG
1,681,632

MEANS FOR SUPPRESSING HIGH HARMONICS IN COMMUTATING ELECTRIC MACHINES

Filed June 22, 1922

INVENTOR:
Arla Ytterberg
By Wm Wallace White
ATTORNEYS.

Patented Aug. 21, 1928.

1,681,632

UNITED STATES PATENT OFFICE.

ARLE YTTERBERG, OF VASTERAS, SWEDEN, ASSIGNOR TO ALLMANNA SVENSKA ELEKTRISKA AKTIEBOLAGET, OF VASTERAS, SWEDEN, A CORPORATION OF SWEDEN.

MEANS FOR SUPPRESSING HIGH HARMONICS IN COMMUTATING ELECTRIC MACHINES.

Application filed June 22, 1922, Serial No. 570,258, and in Sweden June 30, 1921.

The current flowing from a commutating A. C. or D. C. generator or the current flowing to a commutating A. C. or D. C. motor shows practically always higher harmonics of frequencies corresponding to the number of commutator bars passing under a brush in a second or to an even multiple thereof, which harmonics may be termed bar harmonics. The generation of such harmonics may be explained in the following manner reference being had to the accompanying drawing:

In the said drawing, Figure 1 diagrammatically represents some of the principal elements of a commutating electric machine;

Figure 1:
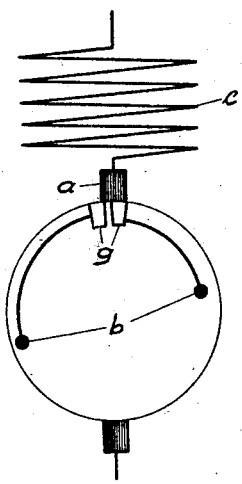

During the passage of two adjacent commutator bars $g$ (Fig. 1) under a brush $a$, the current in the coil $b$ lying between said bars is to be reversed. During this period of reversing, the coil is short-circuited through the brush, whence more or less uneven voltage drop will occur in the latter. The total voltage from brush to brush will be influenced by this boltage drop, and hereby one species of (primary) bar harmonics in the voltage and current of the machine will be produced.

Figure 2:
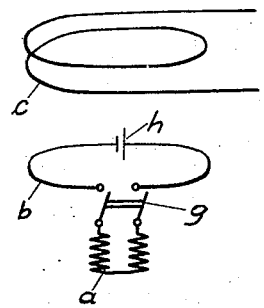
Fig. 2 is a symbolic diagram, illustrating the mode of operation of the elements shown in Fig. 1 by an analogy.

Another species of such higher harmonics, which may be far more serious, may, however, occur as a secondary effect in certain commutating machines, depending upon the following circumstances. The coil $b$ short-circuited during commutation generally embraces the entire iron core of one of the pole pairs of the machine. The same core is also embraced by the exciting winding $c$ which thus together with the short-circuited coil can be regarded as a transformer where the primary current is a high frequency alternating current. The result will be the same as that of the connection shown in Fig. 2, if the switch $g$ shown therein is closed and broken in rapid succession. The brush is in Fig. 2 represented by a resistance $a$ and the E. M. F. generated in the coil $b$ by a galvanic element $h$. The pulsating current thus arising in the coil $b$ will generate an alternating E. M. F. in the secondary coil $c$. In this secondary winding (the exciting winding of the machine) which has a larger number of turns, a comparatively high voltage is generated which materially reinforces the aforesaid higher harmonics. In D. C. machines where an essential part of the magnetic circuit generally consists of solid iron, the latter exerts a certain damping action on the higher harmonics, but in commutating A. C. machines, where the entire circuit is laminated, no such damping comes into consideration. I suppose this to be the main reason for the fact that the "bar harmonics," which have particularly been known as sources of telephone disturbances in railway operation, generally are considered as more serious in commutating A. C. machines than in D. C. machines.

Figure 3:
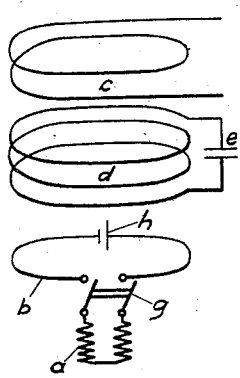
Fig. 3 illustrates the introduction of an element embodying my invention into the diagram of Fig. 2.
Figure 4:
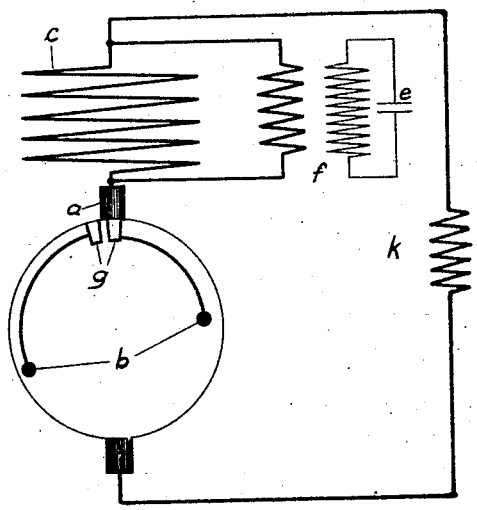
Fig. 4 shows a preferred form of the invention as applied to Fig. 1.

The voltage harmonic thus produced in the exciter winding of the machine causes a corresponding current harmonic to traverse the line, and this harmonic is the immediate source of most of the arising disturbances. For suppressing the former as well as the latter there is provided, according to the present invention, a capacity shunting the exciter winding and having such character as to practically short-circuit the said winding for frequencies approaching that of the bar harmonics but to act as a large resistance for the low frequency of the ordinary machine current (or as an infinite resistance if the latter is a direct current). Fig. 3 shows this arrangement in principle. A winding $d$ closed through a condenser $e$ is placed on the same magnetic core as the coils $b$ and $c$. This winding provides practically a short-circuit for the high frequency currents but a high resistance for low frequency currents. In practice, it is generally more convenient to use the exciting winding $c$ itself for short circuiting the high frequency current through the condenser, either directly or through the intermediary of a transformer $f$, as shown in Fig. 4 and more fully explained hereinafter. In said figure is also shown an external closed circuit in which the coil $k$ represents the armature winding of a generator or the secondary of a transformer. As the machines here in question (mainly railway motors) very often operate at highly variable speed, the bar frequency too will often be variable. In such cases, it is of particular importance that the shunt has a low resistance for currents of the frequencies which have proved most disturbing for telephone speech, that is about 800 cycles per second or more.

Especially, when a transformer is inserted between exciting winding and condenser, as shown in Fig. 4, the leakage inductance of this transformer can easily be made large enough to serve as the required inductance.

While the capacity of the condenser should preferably be such as to form resonance with the series inductance between its terminals and those of the exciting winding for the frequency to be suppressed, it is, on the other hand, important that it shall not, for any frequency existing in the circuit, form resonance with the leakage inductance of the exciting winding itself. This would mean that the condenser and exciting winding together would form a resonance circuit for this frequency and that a dangerous voltage could arise between the terminals of the exciting winding. As the leakage inductance of this winding is generally rather large, it is no danger that the last-mentioned resonance frequency be so high as that of the commutating harmonics (800 or more). On the other hand, the said leakage inductance should not be so large that the resonance frequency of the circuit $c$—$e$ (Fig. 4), taken as a whole, should approach the normal frequency of the machine current, usually 15-25 cycles. Hence it follows that the resonance frequency of the circuit $c$—$e$, taken as a whole, or what is practically the same, the frequency of resonance between $e$ and the leakage inductance of $c$, should lie somewhere between 50 and 500 cycles per second, while the frequency of resonance between $e$ and the leakage inductance of the transformer $f$ (or separate reactance coil, if such is used) should be of the order of magnitude of 800.

By short-circuiting the secondary, the high frequency voltage of the transformer formed by the armature coil and exciter winding will be very low and thus not capable of producing appreciable disturbing harmonics in the line. As at such a low voltage the dielectric strength of the condenser is generally not entirely utilized, it is often advantageous to connect a transformer between the exciter winding and the condenser. The action of such a transformer will be the same as multiplying the capacity of the condenser by the square of the transformer ratio. The said ratio is in practice not limited by the dielectric stress put on the condenser by the high frequency harmonics but by the transformed normal low frequency voltage on the exciter winding.

While the exciter winding, as already stated, is the principal source of the disturbing high harmonics, such harmonics may also arise in the other stationary windings of the machine, that is, in the compensating and commutating windings. If for suppressing the said harmonics, these windings be provided with capacitative shunts they should be independent of that of the exciter winding. If not, harmonics may arise in each winding separately which, while compensating the direct external action of one another, still act indirectly on the line by way of the armature winding in which they may cause tertiary harmonics by reason of their different magnetic relation to said latter winding.

If in multipolar machines, the exciting coils are connected in series in immediate succession, they may be connected to a common condenser circuit. While in such a case the bar harmonics of the different coils may be of different phase, the external action of the resultant harmonic will always be suppressed. The same holds good for the other windings, if these be provided with capacitative shunts.

Having now described my invention and the manner of its operation, I declare that what I claim is:—

1. The combination, with a commutating electric machine operating on an external closed circuit and having an exciting winding connected to said circuit and taking up a fraction of the total voltage of the machine, of a circuit shunting the exciting winding only, and a condenser in said circuit.

2. The combination, with a commutating electric machine operating on an external closed circuit and having an exciting winding connected to said circuit and taking up a fraction of the voltage of the machine, of a transformer, and a condenser connected to the terminals of said exciting winding through the intermediary of said transformer.

3. The combination, with a commutating electric machine operating on an external closed circuit and having an exciting winding connected to said circuit and taking up a fraction of the voltage of the machine, of means for shunting said exciting winding only, said means comprising a transformer and a condenser energized thereby.

4. The combination with a commutating type electric machine having a series winding, of means for reducing commutator harmonics which comprises a condensive reactance shunting the series coil only.

In testimony whereof I have affixed my signature.

ARLE YTTERBERG.